United States Patent [19]

Parent et al.

[11] Patent Number: 4,531,314

[45] Date of Patent: Jul. 30, 1985

[54] CALENDAR

[75] Inventors: Christopher A. Parent, West Springfield; William R. Ferry, Feeding Hills, both of Mass.

[73] Assignee: United Innovations div. of United Engineers, Inc., Holyoke, Mass.

[21] Appl. No.: 600,900

[22] Filed: Apr. 16, 1984

[51] Int. Cl.³ .............................................. G09B 3/04
[52] U.S. Cl. ....................................... 40/119; 40/121
[58] Field of Search ..................... 40/119, 121; 283/58

[56] References Cited

U.S. PATENT DOCUMENTS

| 1,507,345 | 9/1924 | Doyle | 40/121 |
| 1,519,643 | 12/1924 | Van Arsdale | 40/121 |
| 1,866,425 | 7/1932 | Shedd | 40/119 |

FOREIGN PATENT DOCUMENTS

| 2257433 | 8/1975 | France | 40/121 |
| 190438 | 4/1937 | Switzerland | 40/121 |
| 10508 | of 1901 | United Kingdom | 40/121 |
| 27766 | of 1911 | United Kingdom | 40/121 |
| 236457 | 7/1925 | United Kingdom | 40/121 |

Primary Examiner—Gene Mancene
Assistant Examiner—Cary E. Stone
Attorney, Agent, or Firm—Ross, Ross & Flavin

[57] ABSTRACT

In a calendar book each page corresponds to a part of a month and is subdivided into a plurality of fragments corresponding to the different parts of the month. The fragments of a page are releasably secured to each other for ready separation. The separated fragments of the pages may be successively removed from the stack as time ensues for continuously revealing the current date and the successive dates next-following beyond the dates of the next-to-be-overturned fragment.

8 Claims, 9 Drawing Figures

CALENDAR

This invention relates to desk type calendar books or planners adapted for aiding the user in keeping readily available reminders of upcoming appointments and other matters dictating the user's attention.

The purpose of the various constructions exemplified is to provide, in each instance, an ever-current planner and/or reminder incorporating consecutively-dated calendar fragments or date display areas, which fragments may be easily overturned or even fully detached in an in seriatim manner wherefor there are continuously exposed to view plural calendar fragments each revealing a display of a plurality of successive days representative of specific calendar dates but also a display of appropriate blank spaces for the user's entry of appropriate writing or indicia to serve him or others as reminders of coming events or of things to do or dates to be kept, as desired.

The invention provides various calendar systems whereby, as successive calendar fragments are one-by-one separated so as to facilitate overturning, if not complete detachment from the book, there is provided a planner which is ever current in that it will continuously display a calendar fragment representative of the current date and a plurality of dates next-following wherefor the user can consistently and continuously have within his ready view indicia of a representative number of calendar dates immediately ahead of the current date.

Figure 1:
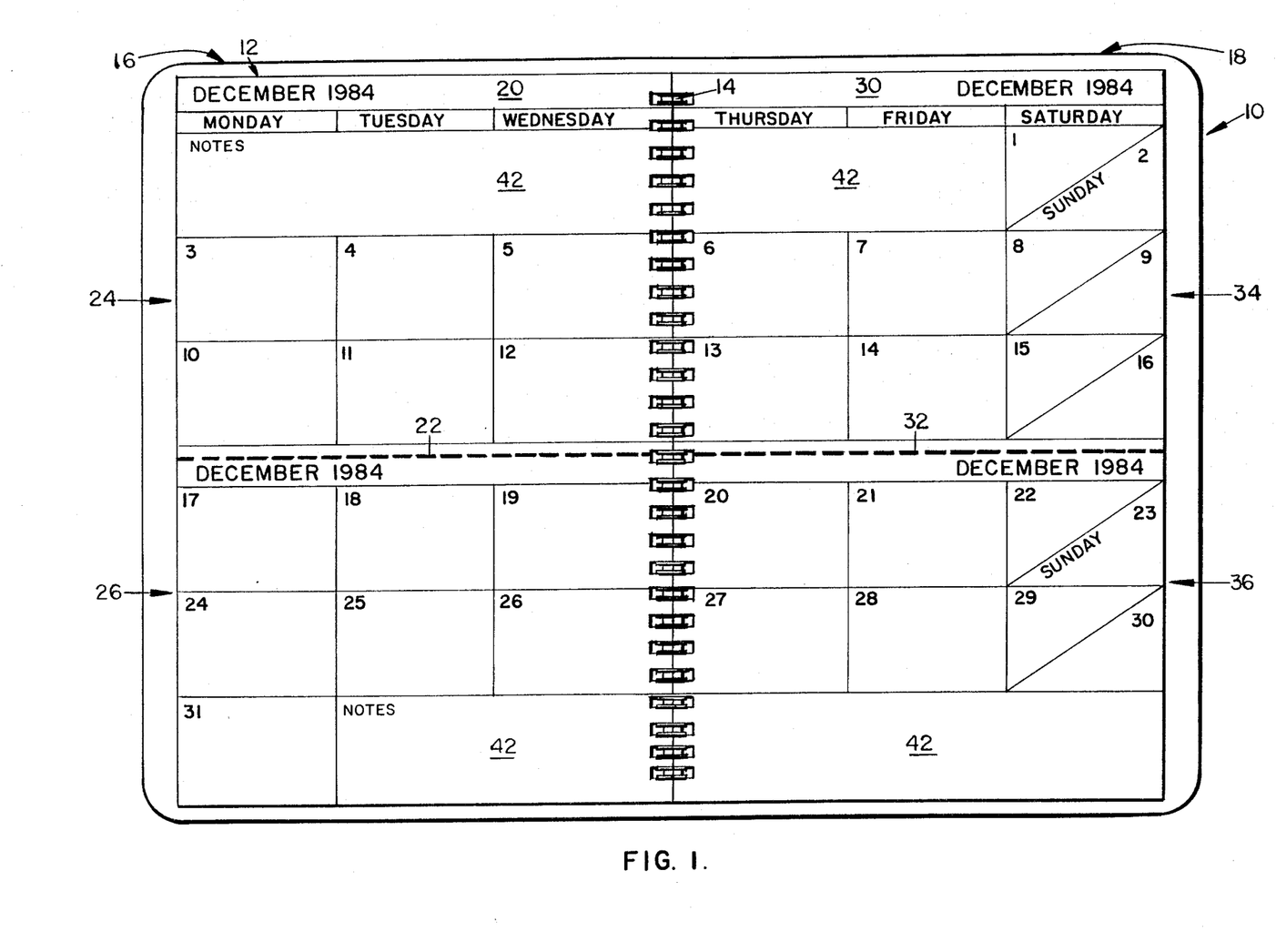
FIGS. 1–3 are successive views in perspective of a first exemplification of a calendar of the invention showing a representative successive series of calendar fragments of a calendar book or planner in position for ready viewing.
Figure 2:
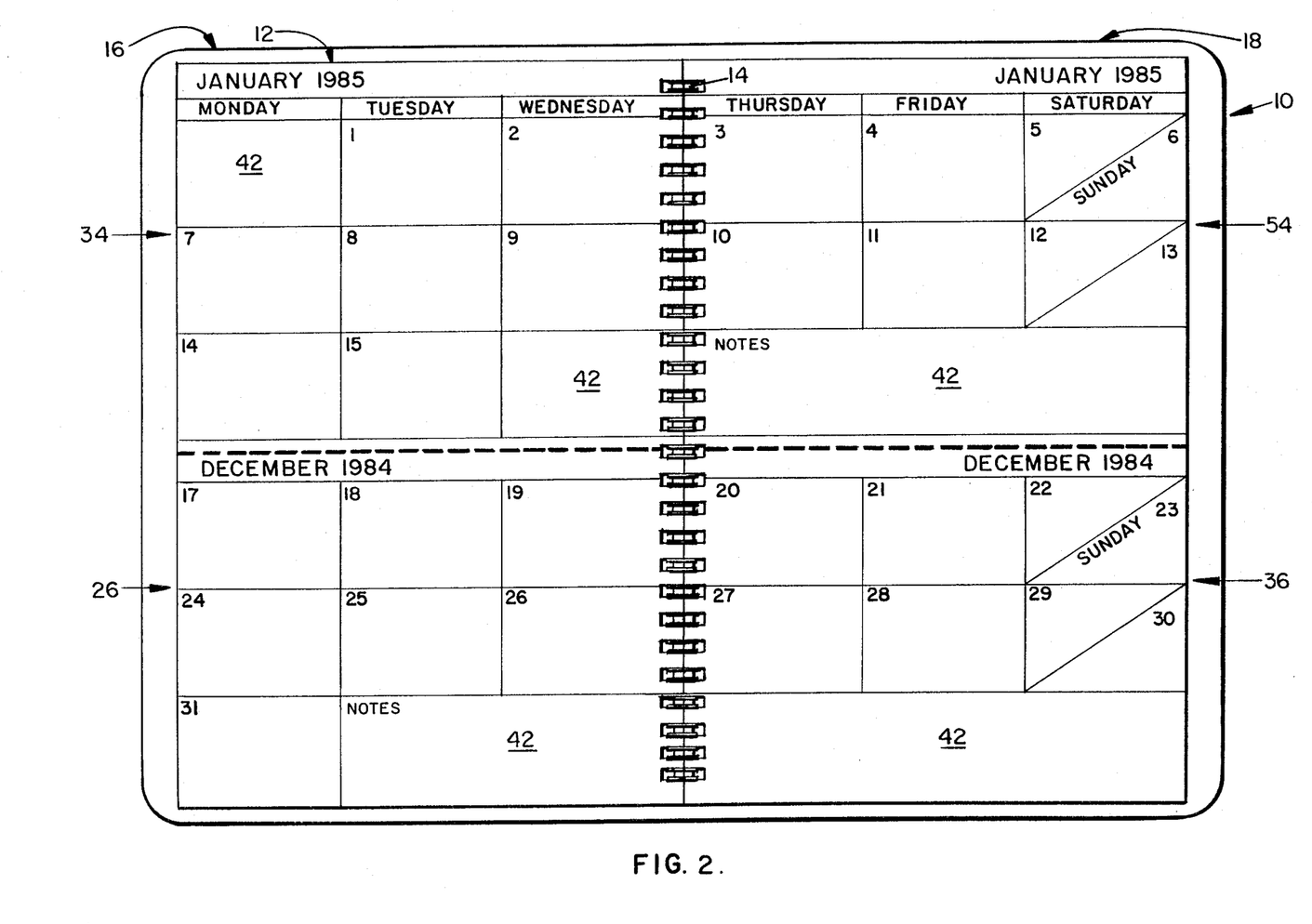
Figure 3:
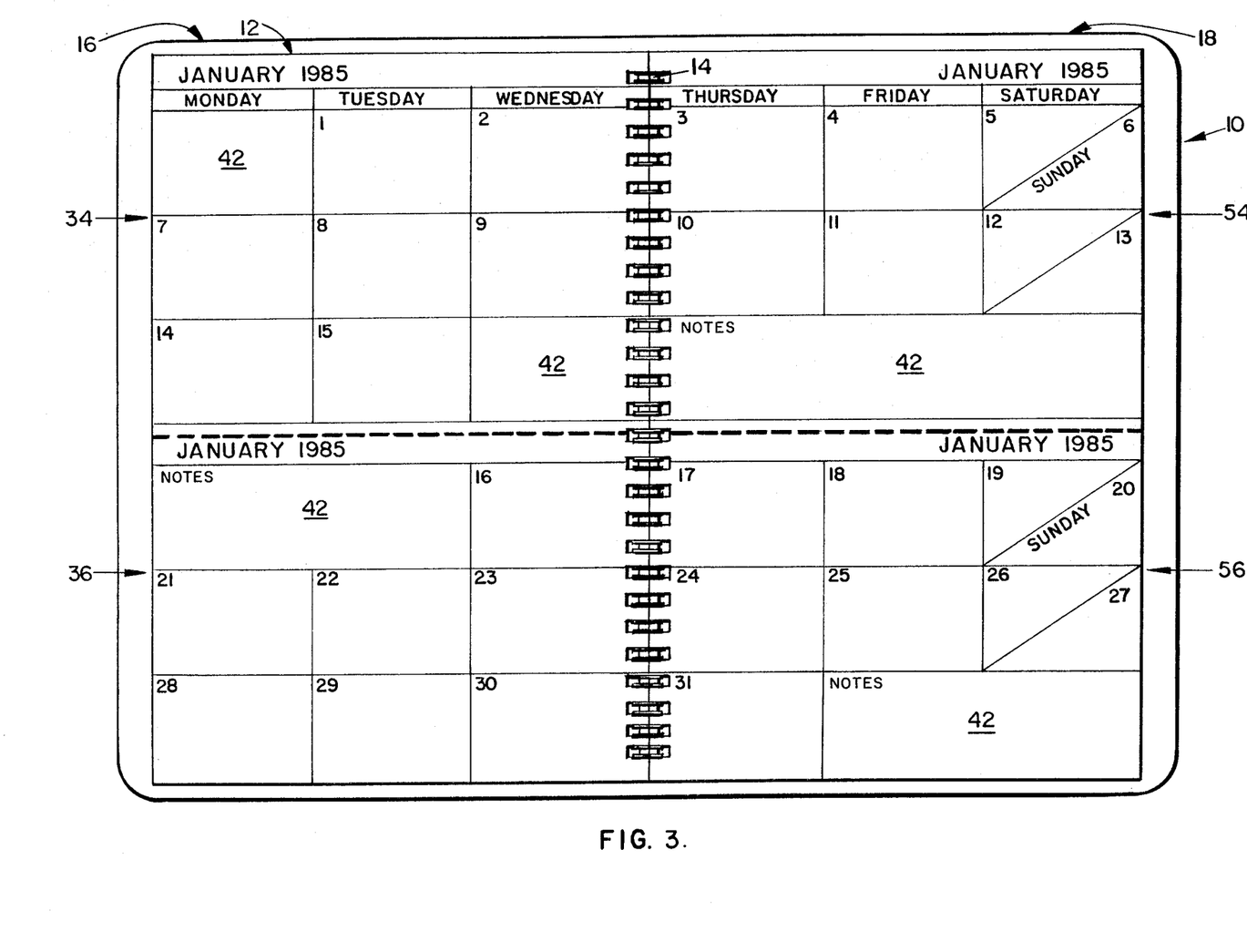

Referring to the first exemplification of FIGS. 1–3, the calendar is identified as a book 10 comprising a stack of sheets 12 bound together at their aligned left-hand edges as by a spiral binding 14 or otherwise by appropriate stitching so as to constitute the book, inclusive of the usual front cover 16 and back cover 18, as are known.

Illustratively, a back side or overturned side of a topmost sheet 20 is represented as bearing indicia thereon indicating the days of the month of December falling on a Monday, Tuesday or Wednesday, said sheet being divided into equal half-portions or calendar fragments by a transverse score line 22 so that the first or upper half portion or calendar fragment 24 can be separated from a second or lower half portion or calendar fragment 26.

An appropriate legend i.e. "December 1984" will be delineated at the top of each calendar fragment and, of course, the appropriate days of the week, i.e. "Monday", "Tuesday", and "Wednesday" will be delineated in the usual columnar arrangement.

The next succeeding sheet 30, rightward of the binding as shown, is represented as bearing indicia thereon indicating the days of the month of December falling on a Thursday, Friday, Saturday or Sunday, said sheet being similarly divided into equal half-portions or calendar fragments by a transverse score line 32 so that the first or upper half portion or calendar fragment 34 can be separated from a second or lower half portion or calendar fragment 36.

Similarly, an appropriate legend, i.e. "December 1984" is delineated at the top of each calendar fragment and, of course, the appropriate days of the week, i.e. "Thursday", "Friday", "Saturday" and "Sunday" will be delineated in the usual columnar arrangement.

As may be best appreciated in the FIG. 1 showing the month of December 1984 is displayed in the usual calendar fashion with the month being substantially divided into halves by the score lines 22, 32 so as to offer two calendar fragments leftward of the binding and two calendar fragments rightward of the binding.

Note spaces 42 are thus provided in the usual areas before commencement of and after termination of the display of the days of the month in their appropriate columns.

Underlying first or upper half portions or calendar fragment 34 will be another upper portion of calendar fragment 54, which fragment will be exposed to view when calendar fragment 34 is separated from lower half portion or calendar fragment 36 along score line 32 and is then overturned with respect to binding 14 so as to overlie first or upper half portion or calendar fragment 24, as shown in FIG. 2.

By so separating and overturning calendar fragment 34, the first 16 days of December now having passed, the user then is favored with a display of the remaining days of December, as before, but more importantly, is now favored with a display of the first 15 days of January 1985, as shown in FIG. 2.

Underlying second or lower half portion or calendar fragment 36 will be another lower half portion or calendar fragment 56, which fragment will be exposed to view when calendar fragment 36, now having been separated along score line 32 is overturned with reference to binding 14 so as to overlie second or lower half portion or calendar fragment 26, as shown in FIG. 3.

By so overturning calendar fragment 36, the last 15 days of December now having passed, the user then is favored with a full display of the month of January.

The successive sheets of the stack are imprinted, in a descending order, with appropriate indicia representative of the days of the months of February, March, April, May, and so forth for a full year or years, as desired. Of course, each such sheet and the imprinting thereon is so arranged as to allow the division of same into appropriate fragments separated by similar transverse score lines.

The sheets of the stack and the imprinting thereon will be in alignment so that whenever a calendar fragment is overturned, the next adjacent previously concealed calendar fragment immediately thereunder will become exposed for reference purposes.

Thus, illustrated, when the calendar fragment showing some of the days of the month of December is overturned, so as to conceal the early days of December, the next underlying fragment immediately therebelow becomes exposed to reveal the first 15 days of the month of January, to the end that, in usage, during the last two weeks of December, the user will see, exposed to the view, the last weeks of December and the first weeks of January. Thus, during the last two weeks of December, the user is enabled to project himself into at least the first 15 days of January insofar as ready planning is concerned.

Likewise, upon expiration of the month of December, when calendar fragment 36 is overturned, the next-adjacent fragment therebelow is exposed so as to allow a display of the last days of December wherefor the user once again is enabled to view a calendar showing the days immediately ahead in point of time.

Stated otherwise, approximately every two weeks, the user, by overturning the appropriate fragment from the stack, is enabled to bring into his view a calendar showing the next succeeding four weeks immediately ahead in point of time.

Obviously, this offers the advantage that a user does not have to suffer the usual anquish resultant from waiting until the last day of the month before overturning that sheet carrying all of the dates of the expiring month and before bringing into view the next-following sheet carrying all of the dates of the next-succeeding month as it approaches commencement.

Herewith, the user is continuously allowing himself a glance, at best, of the days of the four weeks ahead and, at worst, of the days of the two weeks ahead.

Figure 4:
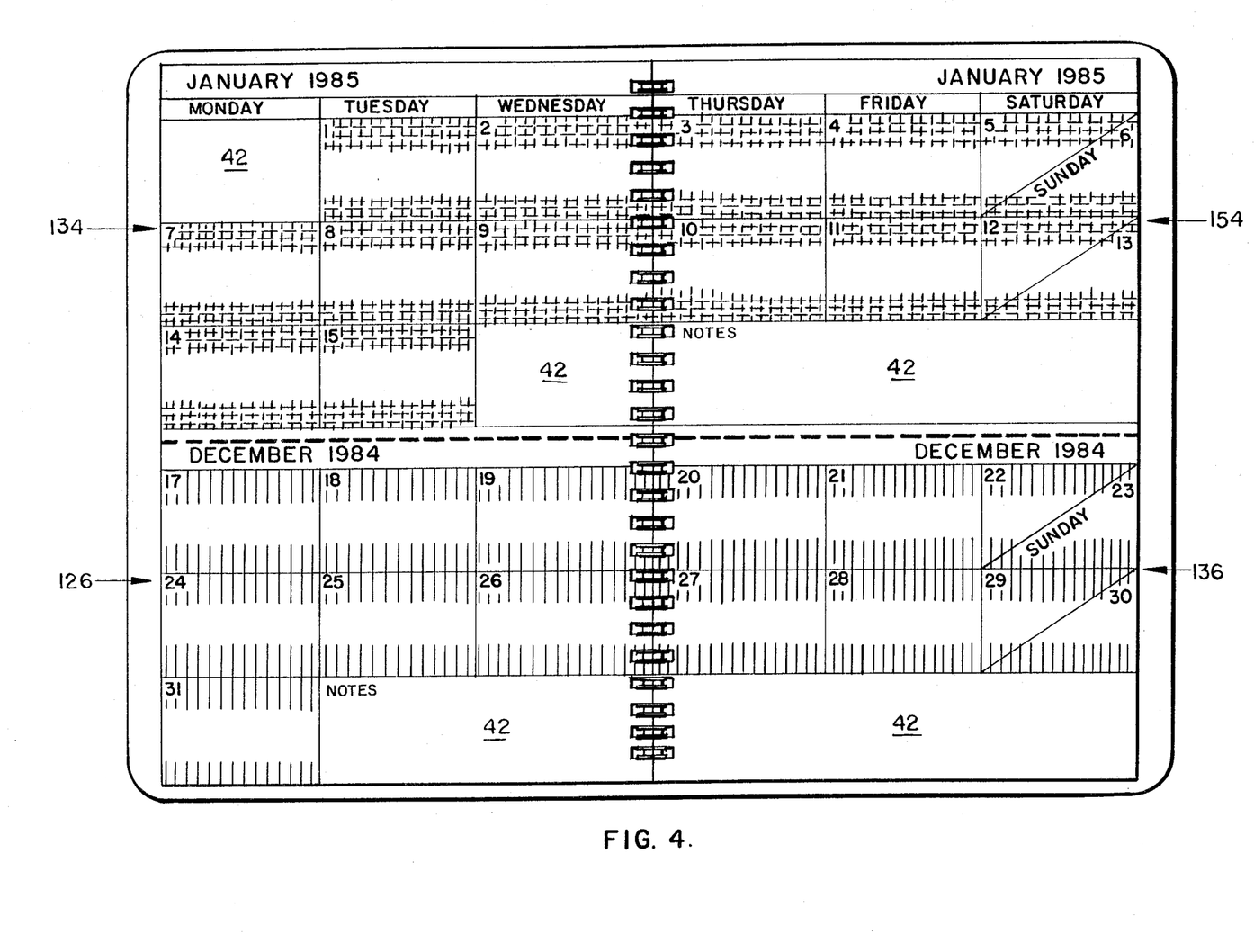
FIGS. 4–9 are views in top plan of second, third, fourth, fifth, sixty and seventh exemplifications respectively of a calendar book or planner of the invention.

Referring now to FIG. 4 showing a second exemplification, the arrangement is similar to the FIG. 2 showing save for the fact that the days of the fragments 134 and 154 showing parts of the month of January are coded in one color, say yellow, and the days of the fragments 126 and 136 showing parts of the month of December are coded in another color, say red, so as to make the December and January days more clearly distinguishable from each other.

Figure 5:
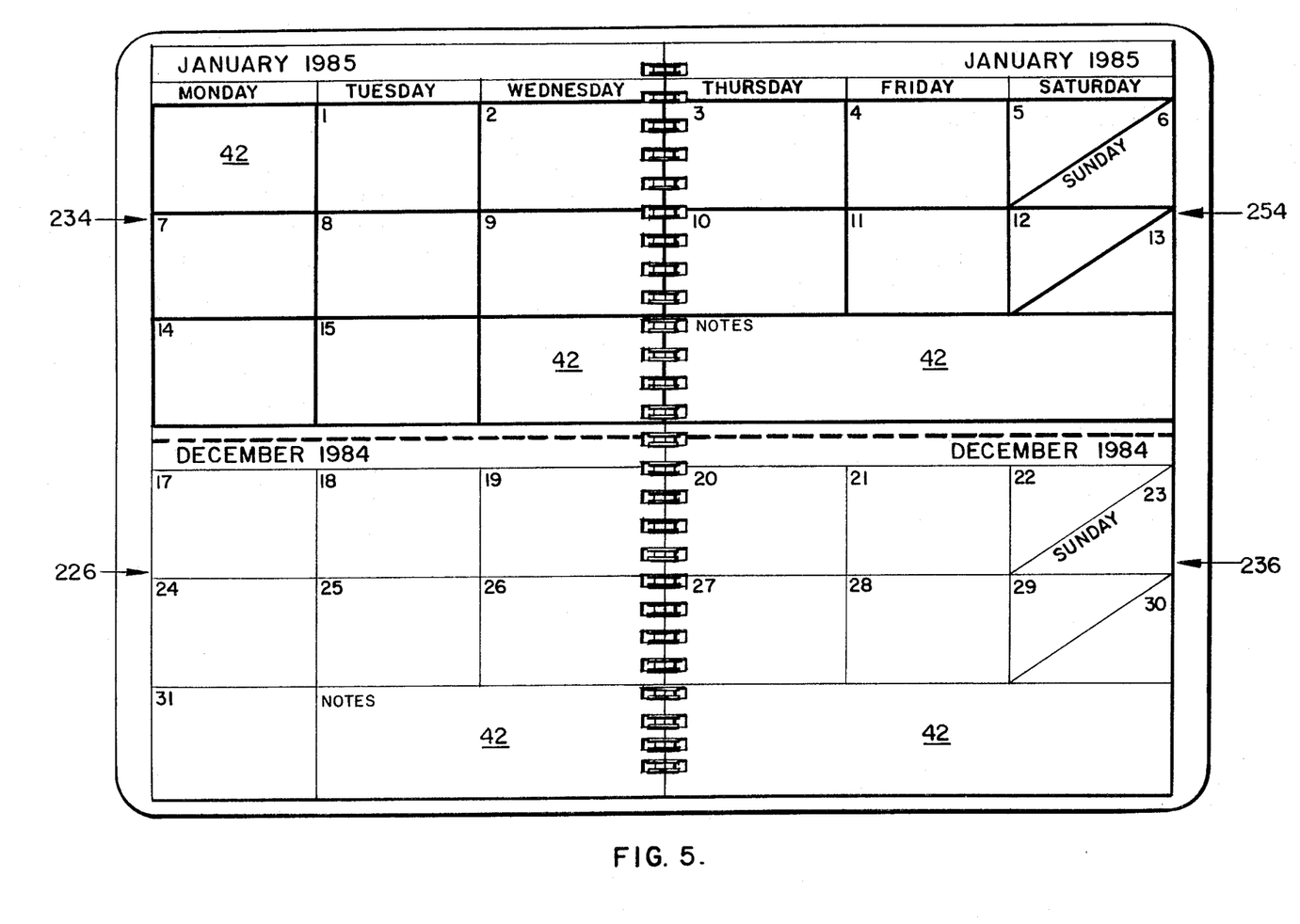

Referring now to FIG. 5 showing a third exemplification, the arrangement is similar to the FIG. 2 showing save for the fact that the days of the fragments 234 and 254 showing parts of the month of January are coded with relatively heavy border lines and the days of the fragments 226 and 236 showing parts of the month of December are coded with relatively thin border lines so as to make same more easily distinguishable from the January days.

Figure 6:
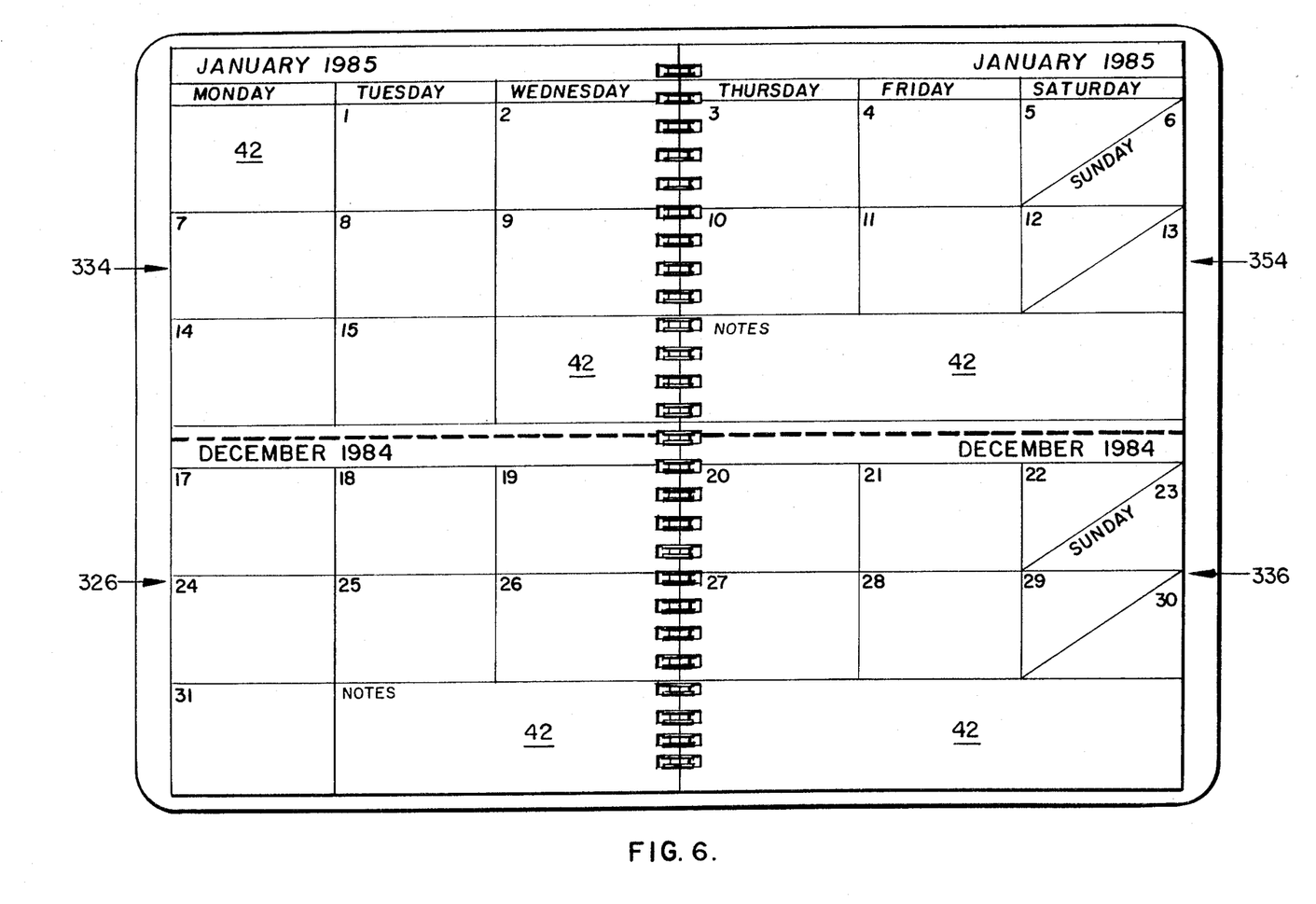

Referring now to FIG. 6 showing a fourth exemplification, the arrangement is similar to the FIG. 2 showing save for the fact that the type used for the month of January is of one front and readily distinguishable from the type used for the month of December so as to make the months more easily distinguishable from each other.

Figure 7:
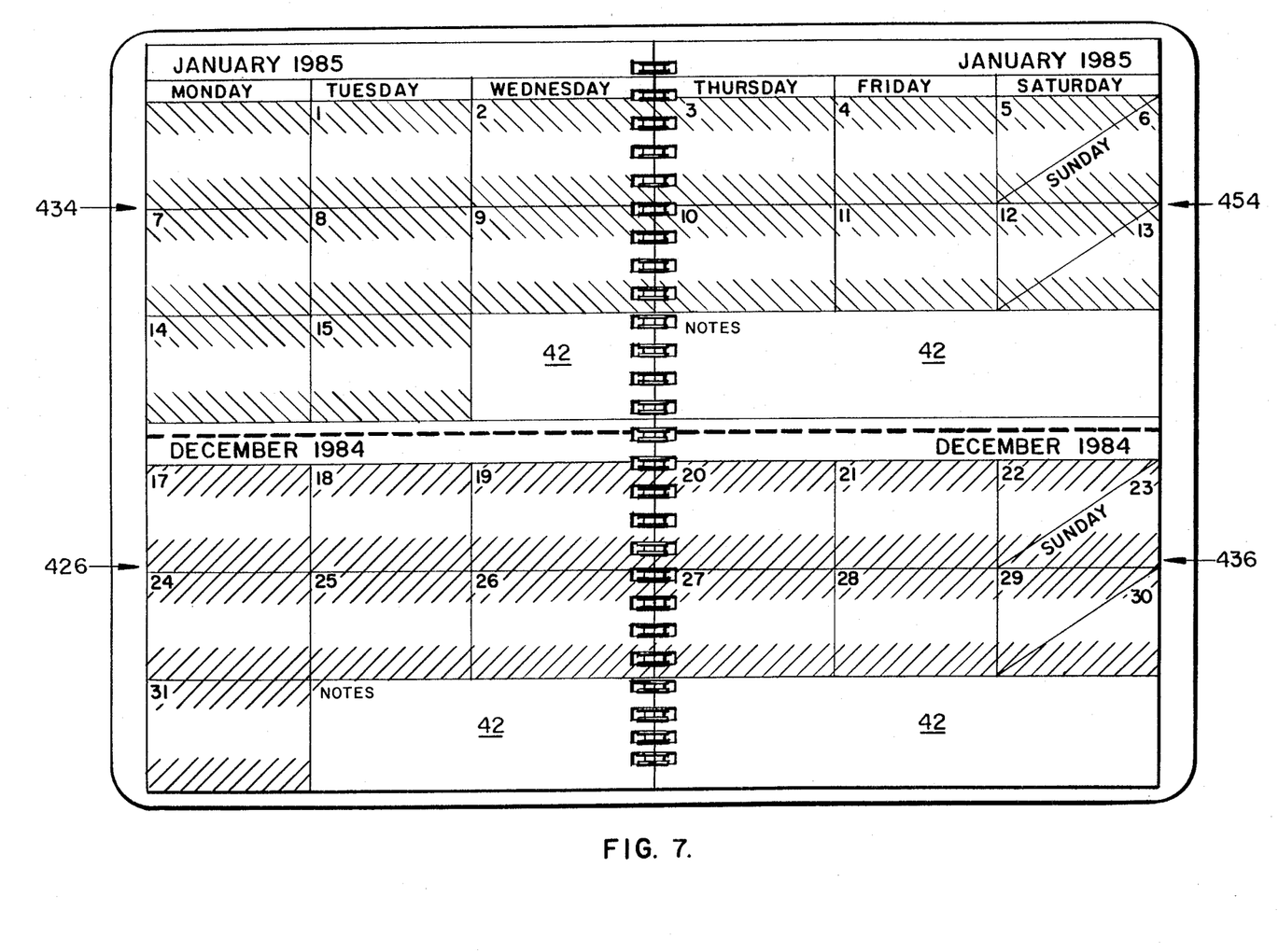

Referring now to FIG. 7 showing a fifth exemplification, the arrangement is similar to the FIG. 2 showing save for the fact that different and therefore distinguishable shadings are made for the days of the month of January on fragments 434 and 454 and for the days of the month of December on fragments 426 and 436.

Figure 8:
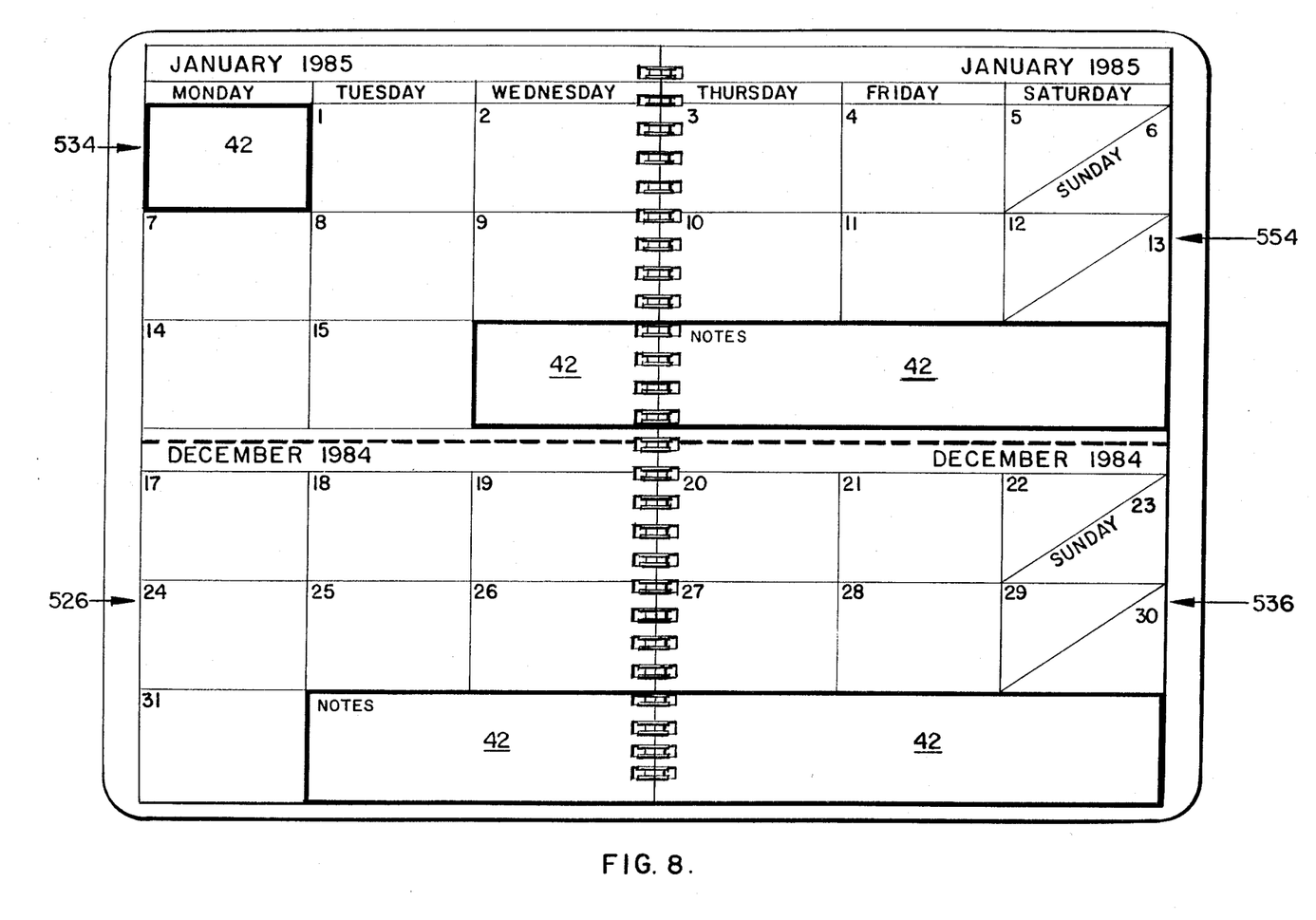

In the FIG. 8 showing representing a sixth exemplification and wherein the arrangement is similar to the FIG. 2 showing save for the fact that the border areas around the note areas are darkened on all of the calendar fragments 534, 554, 526 and 536 so as to make same more readily observable.

Figure 9:
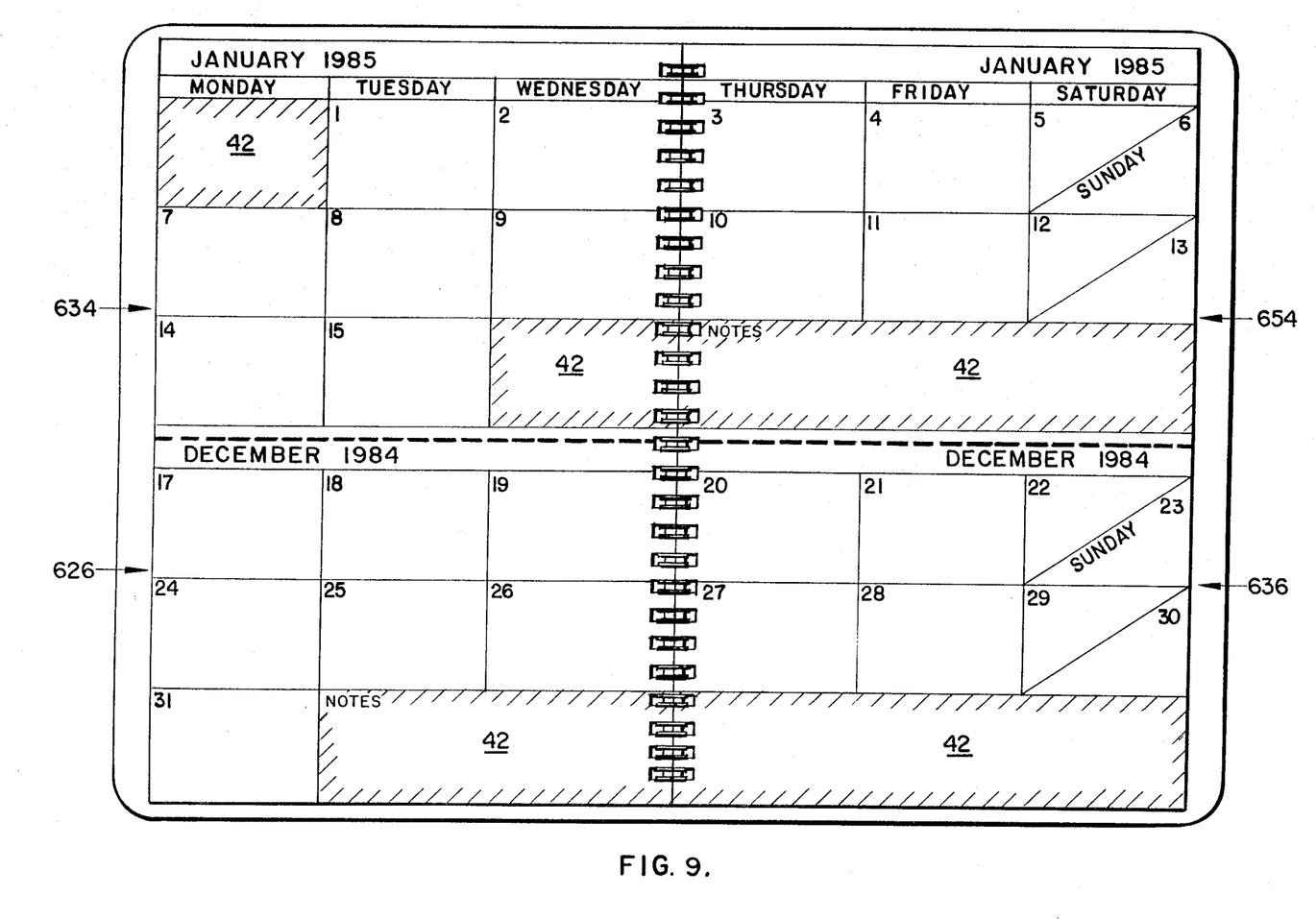

In FIG. 9 showing representing the seventh exemplification, the arrangement is similar to the FIG. 2 showing save for the fact that the note spaces on the calendar fragments 634, 654, 626, and 636 are shown in a different and distinguishing shading so as to make same more readily observable and distinguishable.

We claim:

1. A calendar book having a plurality of pages hingedly connected to each other by a hinge means, each page bearing delineations corresponding to a part of a month and being subdivided into a plurality of segments each corresponding to a different portion of the month, the segments of a page being releasably secured to each other for ready separation from each other, each segment being separately hingedly connected to the book by the hinge means, all adapted and arranged whereby the segments of the pages may be selectively and successively separated from the plurality of pages as time ensues for continuously revealing the current date and the successive dates next-following beyond the dates of the next-to-be-overturned fragment.

2. In the calendar book of claim 1, the days of the segments showing the parts of one month being color coded differently from the days of the segments showing the parts of the next succeeding or preceding month.

3. In the calendar book of claim 1, the days of the segments showing the parts of one month being framed differently from the days of the segments showing the parts of the next succeeding or preceding month.

4. In the calendar book of claim 1, the days of the segments showing the parts of one month being identified by the name of the month delineated by one type style for distinguishing from the days of the segments showing the parts of the next succeeding or preceding month identified by the name of the month delineated by a distinguishing type style.

5. In the calendar book of claim 1, the days of the segments showing the parts of one month being shaded differently from the days of the segments showing the parts of the next succeeding or preceding month.

6. A calendar book having the months delineated on a stack of oppositely facing pages representative of the months, each page being arranged in calendar segments each bearing delineations representative of a portion of the month, the calendar segments being arranged to be overturned successively and independently of each other whereby as one calendar segment is overturned a calendar segments of the next succeeding month is revealed so that a number of days beyond those delineated on the next-to-be-overturned segment are available for ready viewing, the pages of the stack being hingedly connected to each other by a hinge means, and the segments of each page being separately hingedly connected by the hinge means.

7. In a calendar having a plurality of separate pages representing particular time periods, the pages being hingedly arranged as a stack of hinged-together pages, each page being subdivided into a plurality of calendar fragments separable from each other along score lines, each fragment being turnable along the hinge line and being separately hingedly connected to the stack, the pages and the calendar fragments of the pages being in substantial alignment so that the overturning of an uppermost calendar fragment reveals the next-underlying calendar fragment therebelow with an additional array of next-following days of the calendar.

8. A calendar book comprised of a stack of pages bound to each other by a spiral binding for facilitating overturning of each page relative to the stack, each page having delineated thereon a plurality of date display areas corresponding to certain successive days of the calendar year and being subdivided into a plurality of sections, each section representing a portion of the date display areas of the page, the sections of each page being releasably secured to each other for ready detachment, each section being separately hingedly connected to the stack by a portion of the spiral binding, all adapted and arranged whereby sections of the pages may be successively overturned relative to the stack as time ensues for continuously revealing the current date and the next successive dates therefollowing beyond the dates of the next-to-be-overturned section.

* * * * *